CLOSED CIRCUIT TELEVISION SYSTEM

Filed Aug. 20, 1957

Inventors
Oren R. Campbell, Jr.
Clair L. McHolland
by Hill, Sherman, Meroni, Gross & Simpson Attys May 8, 1962 O. R. CAMPBELL, JR., ET AL 3,033,922

CLOSED CIRCUIT TELEVISION SYSTEM

Filed Aug. 20, 1957 4 Sheets-Sheet 2

Inventors
Oren R. Campbell, Jr.
Clair L. McHolland
by Hill, Sherman, Meroni, Gross & Simpson Attys Inventors
Oren R. Campbell, Jr.
Clair L. McHolland
by Hill, Sherman, Meroni, Gross & Simpson Attys Inventors
Oren R. Campbell, Jr.
Clair L. McHolland
by Hill, Sherman, Meroni, Gross & Simpson Attys 3,033,922

CLOSED CIRCUIT TELEVISION SYSTEM

Oren R. Campbell, Jr., 344 Coffeen St., and Clair L. McHolland, 1432 Big Horn Ave., both of Sheridan, Wyo.

Filed Aug. 20, 1957, Ser. No. 679,210
13 Claims. (Cl. 178—5.6)

The present invention relates in general to subscription type closed circuit television systems and more particularly concerns a novel system in which a motion picture film may be substantially simultaneously projected upon the viewing screen in a motion picture theatre and transmitted over a closed circuit to selected television sets of subscribers. Selection of the television set which displays the film is controlled by signals emitted from a center which the film exhibitor may control in response to a request from the subscriber, thus enabling the exhibitor to have an accurate record at all times of the state of receipts from television subscribers.

Closed circuit subscription type television systems are frequently found in isolated communities where direct reception of television signals from distant cities is impossible or difficult at most points in the region. A central receiver may be located where reception is comparatively good and by utilizing costly, high gain antennas to receive the signals from the distant stations, derive signals of sufficient strength for distribution to the homes of individual subscribers over a transmission system, such as a coaxial cable system. Typically the subscriber will pay an initial installation and a monthly fee for the service cost. However, there generally is provided no means for restricting the use of the television signals transmitted over the system to the individual subscriber.

Should it be desired to transmit selected programs, such as first-run movies to a limited television audience whereby the viewer must pay an extra fee to see the film, it is possible to use one of the conventional coding systems wherein the transmitted television signal is scrambled so that its appearance on a television set adapted to receive only standard television signals displays the received signal as an incoherent array of contrasting areas. In order to unscramble the picture, an appropriate decoder must be attached to the television set and suitable steps taken by the subscriber, such as inserting a coin or card in the decoder to enable the picture to appear coherently upon the television screen.

The disadvantages of such systems are numerous. The apparatus required to scramble and unscramble the television signal is complex. Moreover, adaptation of the decoder to the associated television set requires internal electrical connections to the circuit. Furthermore, when the decoder is coin-operated, an employee must visit each subscriber in order to collect the tolls. Where the subscriber actuates a mechanism which marks a card to indicate the amount of service used by the subscriber, there is delay involved in transmitting the marked cards from the subscriber to the exhibitor of the special program. Thus, such exhibitor does not have a current account of his billings for a given program.

The present invention contemplates and has as a primary object the provision of means for utilizing a closed circuit television system in cooperation with a novel motion picture projector arrangement whereby the same motion picture may be projected upon the viewing screen before an audience within the theater and to selected subscribers at their request and under the control of the motion picture exhibitor.

Another object of the invention is the provision of means for projecting the same motion picture film substantially simultaneously upon a viewing screen and a television camera.

Still another object of the invention is the provision of means for changing over from one dual projector system to another, which systems achieve the foregoing objects, whereby changeover from one projector in one system to the corresponding projector in the other system is delayed to compensate for the time involved in sequentially displaying a particular frame by both projectors of a system.

A further object of the invention is to provide a control circuit for use with a subscriber's television set which may be externally attached to the latter to permit receipt of special programs without requiring internal connections to the television set.

Still a further object of the invention is the provision of means for utilizing the same transmission line to carry both television signals and control signals.

It is an object of the invention to provide a television closed circuit system for transmitting current motion pictures to subscribers at their request under the control of the film exhibitor whereby he currently and continuously knows the recepits for a given exhibition.

It is a further object of the invention to provide a dial system for selectively activating control boxes to permit a subscriber to view a particular exhibition, which system is readily adaptable for automatic operation. That is to say, a requesting subscriber may automatically activate his own control box simultaneously with such activation being automatically recorded in the central control office.

According to the invention, there is provided a pair of synchronously driven projectors through which the same motion picture film passes, one projecting the film on the theater viewing screen and converting the associated sound signal thereon to sound energy which emanates from the theater loud speaker system, while the other projects the film on a television camera and converts the corresponding sound track signal into electrical energy. The latter sound electrical signal and the video signal derived from the television camera are combined with a carrier signal in a conventional television transmitter which emits a standard television signal having spectral components within a segment of the frequency spectrum corresponding to a standard television channel. This standard television signal energizes a cable distribution system which couples the television signal to control boxes, each control box being associated with a standard television set of a subscriber. A central control system is provided which supplies signals over the same cable distribution system carrying the standard television signal for selectively activating selected control boxes to permit the television sets of the subscribers with control boxes thus activated to receive standard television signal. Normally, control boxes of customers requesting the picture being exhibited are the only ones activated and the central control system office knows at all times the number of subscribers viewing, and, accordingly, the receipts which may be attributed to the particular exhibition.

According to one aspect of the invention, dual projector pairs are utilized to permit changeover from one reel to the following reel without interrupting continuity of the film showing whereby switchover from the projector of a pair which last showed a particular frame to the corresponding projector of the other pair is delayed by a time interval substantially equal to the time required for a frame to be projected by both projectors of a pair.

In one form of the invention, the control box is so arranged that a filter is interposed between the transmission line and the television set which substantially rejects the standard television channel carrying the exhibited picture while passing all other channels. Hence, a subscriber may still watch all the channels covered by his regular subscription rate, yet be precluded from watching the standard television channel carrying the exhibited picture unless his control box is activated from the central control office. In this arrangement, the selecting signal from the central office effectively bypasses the rejection filter.

In a preferred embodiment of the invention, a dial system is employed to activate the selected control boxes. Thus, a subscriber desiring to view an exhibited film may phone the control center, give the operator his name and the operator may dial his code number while making a record for the purpose of billing the designated subscriber.

An advantage of a dial system is that it is readily adaptable for automatic operation. In the form of the invention embodying automatic control, the customer phones the control center and when connected thereto hears a dial tone in his receiver. The customer then dials his own code number, which number is automatically recorded in the central office while the appropriate coded signals are transmitted over the transmission line to activate the control box of the requesting customer.

Other features, objects and advantages of the invention will become apparent from the following specification when read in connection with the accompanying drawing in which.

Figure 1:
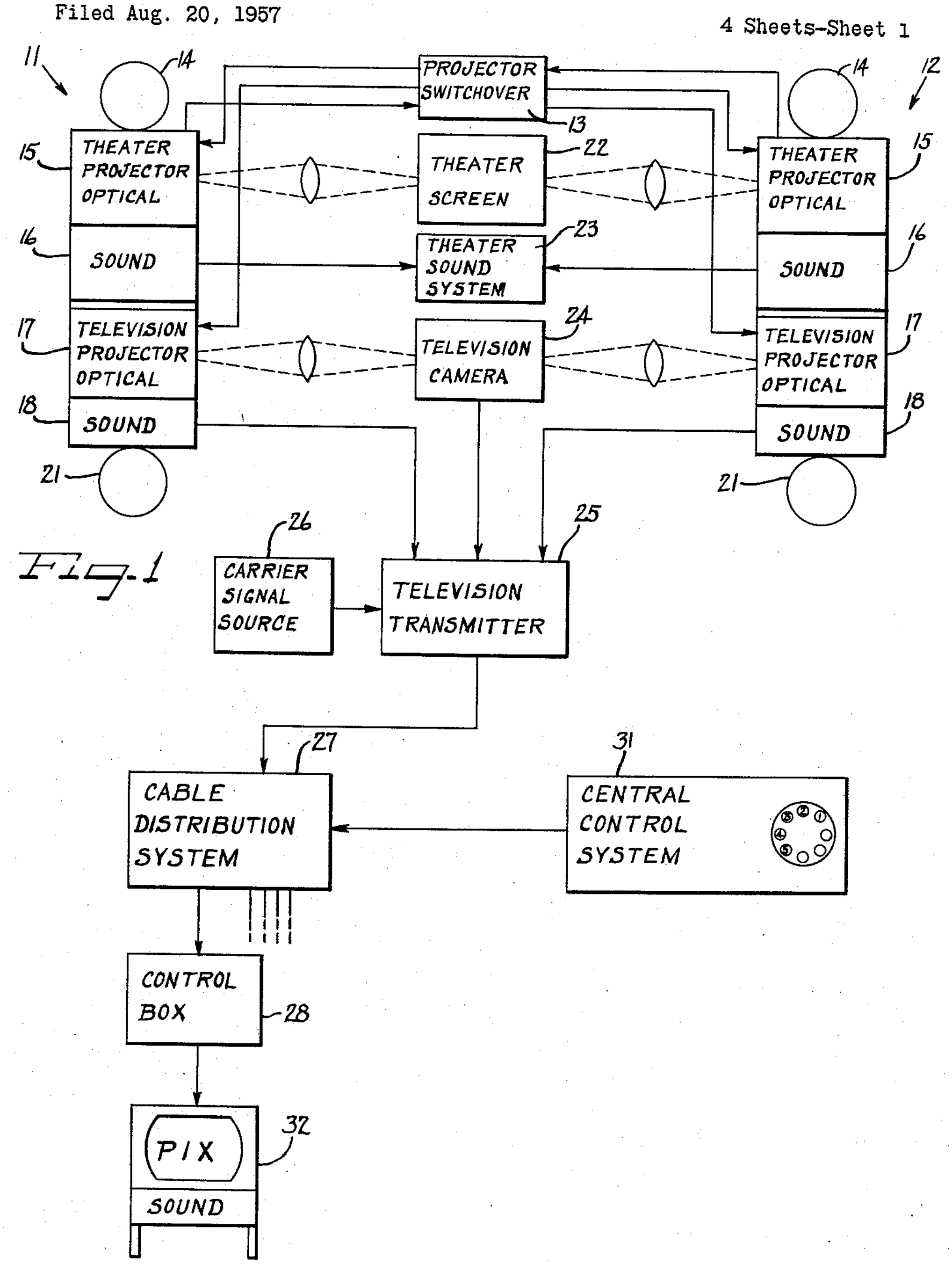
FIG. 1 is a block diagram of the closed circuit system.

With reference now to the drawing and more particularly FIG. 1 thereof, there is illustrated a block diagram of an exemplary embodiment of the invention. The system is seen to comprise a first pair of projectors 11 and a second pair of projectors 12, one pair of which is appropriately selected by projector switchover 13. Each of the latter pairs comprises an upper feed magazine 14, a theater projector with an optical portion 15 and a sound portion 16, and a television projector with an optical portion 17 and sound portion 18, the film being rewound upon takeup magazine 21 after projection. The optical portion 15 of the theater projector then operatively projects the film over the optical path indicated by the dotted lines to theater screen 22 where the film is exhibited to the viewing audience in the theater while the sound signal derived from the sound portion of the projector then operating is coupled to the theater sound system 23. The same film is passed through the television projector of the then operating pair and the optical portion projects the film upon television camera 24 over the optical path indicated by the connecting broken lines. A sound signal from the operating television projector is applied to television transmitter 25 along with a video signal derived from television camera 24 and a picture carrier signal derived from carrier signal source 26. These three signals are combined in television transmitter 25 to provide a standard television signal whose spectral components lie within the frequency spectrum of a standard television channel. The standard television signal is coupled through cable distribution system 27 to control box 28 associated with each standard television set 32 of a subscriber. The control box 28, when activated by appropriate control signals from central control system 31, also transmitted through cable distribution system 27, couples the standard television signal to television set 32.

Figure 2:
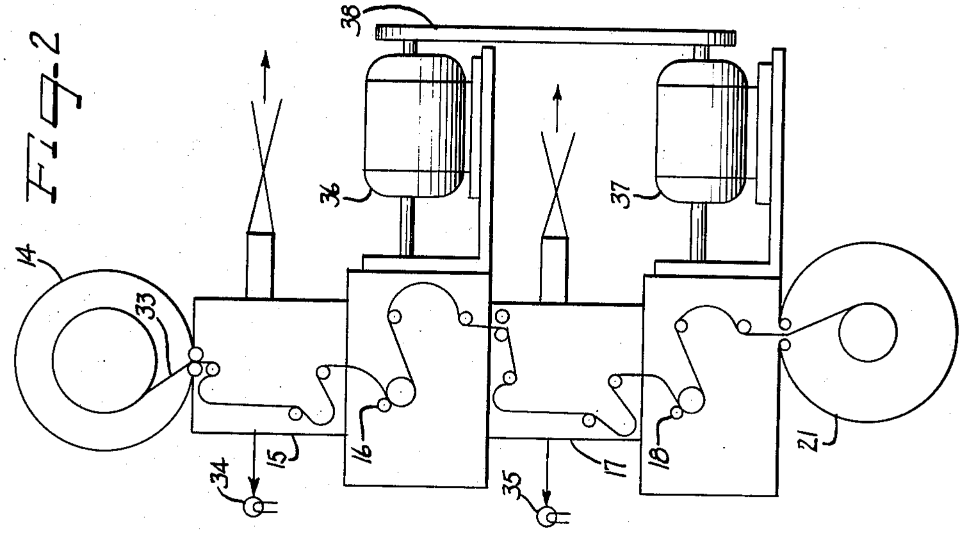
FIG. 2 illustrates in pictorial form the means for projecting the same film through both projectors.

Having generally described the system arrangement, details of certain portions of the system will be discussed in detail. With reference to FIGURE 2, there is illustrated a side view of a suitable embodiment for projecting the same film reel through theater and television projectors. The film 33 is supplied from upper feed magazine 14 and threaded through theater projector 15, theater sound pickup 16, television projector 17, television sound pickup 18 and rewound upon lower takeup magazine 21 in conventional manner. Theater and television projector lamps 34 and 35 respectively are light sources for projectors 15 and 17 respectively, which project the film upon theater screen 22 and television camera 24 (FIG. 1), respectively. The latter projectors are respectively driven by drive motors 36 and 37 which are synchronized mechanically by the chain drive interlock system 38, thereby preventing excessive strain from being applied to the film due to unequal forces being applied by the projectors upon the film, especially likely when starting or stopping.

Figure 3:
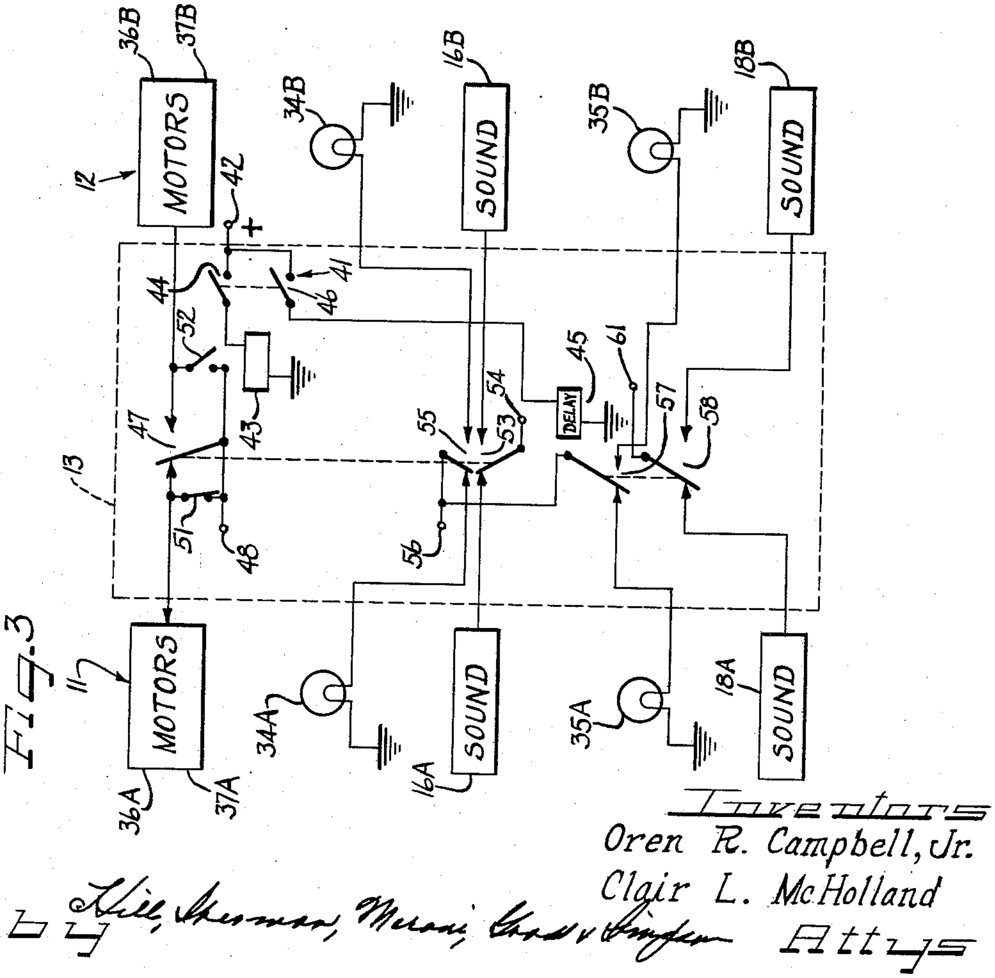
FIG. 3 is a block-schematic circuit diagram of apparatus for switching projection from one pair to the other.

Referring to FIG. 3, there is illustrated a suitable projector switchover arrangement for changing from one telecision projector to the other after the theater projectors have been changed. The numerical portions of the alphanumeric reference symbols which identify certain components in FIG. 3 correspond to the reference numeral identifying similar elements in other portions of the drawings, the appended letter A being identified with projector pair 11, and the appended letter B being identified with projector pair 12. The changeover apparatus 13 is seen to comprise a single-pole double-throw switch 41, which couples a source of positive potential on terminal 42 to relay solenoid 43 through contacts 44 and to delay relay solenoid 45 through contacts 46 when closed. Associated with relay solenoid 43 are contacts 47 which couple a source of motor energization potential on terminal 48 to either motors 36A and 37A or motors 36B and 37B, such potential also being coupled to the latter motors by switches 51 and 52, respectively, when closed. Also associated with relay solenoid 43 are contacts 53 which couple sound portion 16A or sound portion 16B to terminal 54, the latter terminal being coupled to theater sound system 23 (FIG. 1), and contacts 55 which couple a source of projector lamp energization potential on terminal 56 to theater projector lamps 34A or 34B.

Associated with delay relay solenoid 45 are contacts 57, which couple the projector lamp illumination potential to television projector lamps 35A or 35B and contacts 58 which couple the sound signal from sound portion 18A or 18B to terminal 61 which is coupled to television transmitter 25 (FIG. 1).

The mode of operation of the projector switchover apparatus which provides the delay in switchover will now be described. With the switches in the positions shown, the relay contacts are connected as indicated and projector pair 11 is operative. As is well known in the art, a flash of light in one corner of the motion picture screen is indicative of the time for changing to the next reel. Previous to this time, the operator has positioned the next reel to be shown, which will be projected from projector pair 12, so that energization of motors 36B and 37B projects the proper frame on theater screen 22. Upon observing the flash of light in the corner of the screen, the operator closes switch 41, thereby energizing relay solenoid 43 and connecting the source of motor energization potential on terminal 48 to motors 36B and 37B. Prior to the switchover, switch 51 had been closed, as indicated; hence, motors 36A and 37A remain energized and continue to pull the last frames of the film on the reel just projected through television projector 17.

Energization of solenoid 43 is substantially immediately effective in extinguishing lamp 34A and igniting 34B and transferring the sound source from sound portion 16A to sound portion 16B so that the theater projector of pair 12 is immediately operative while the theater projector of pair 11 is substantially immediately disabled. Closing switch 41 also energizes delay solenoid 45; however, it is so arranged that its associated arms do not change position upon energization or deenergization for a time interval which is substantially equal to the time interval between projection of a particular frame from theater projector 15 and television projector 17.

It is apparent to those skilled in the art that the desired delay could be obtained thermally, electromagnetically, by a time clock, or by other suitable means. Accordingly, television projector lamp 35A remains ignited and terminal 61 remains energized with sound signal from sound portion 18A until the frame which was projected from theater projector 15 at the time switch 41 was closed is projected from television projector 17. Then, television projector lamp 35A is extinguished and lamp 35B ignited and the sound signal upon terminal 61 then originates from sound source 18A instead of sound source 18B. Switch 51 is then opened and switch 52 closed, switch 51 being opened normally after the particular reel has been completely wound upon lower take-up magazine 21. While the second reel is being shown by projector pair 12, the previously shown reel may be rewound.

To effect switchover from pair 12 to pair 11, the operator need only open switch 41 when the light flash is again observed in a corner of the theater screen. Operation is substantially the same as that described above in connection with the changeover from pair 11 to pair 12. If automatic changeover is employed switch 41 would comprise the contacts of a double-pole single-throw relay controlled by means which sense the end of a reel being projected from a respective theater projector.

Figure 4:
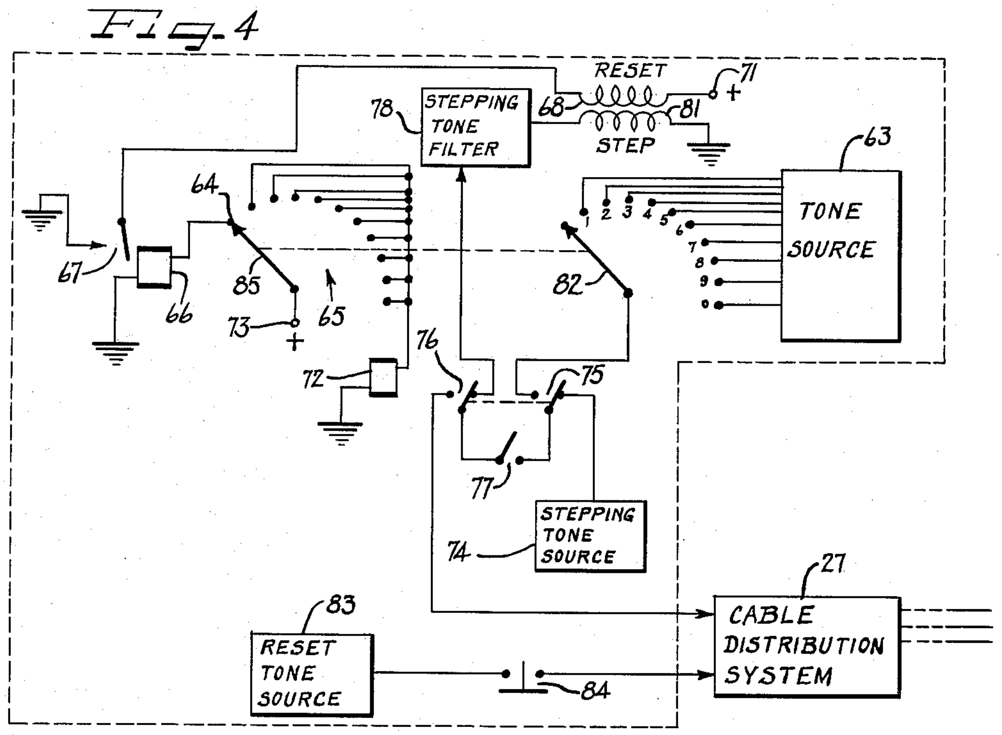
FIG. 4 is a block diagram of the control system for selectively activating the control box of a subscriber.

Referring to FIG. 4, there is illustrated a combined block-schematic circuit diagram of a central control system 31 suitable for selectively activating a control box associated with the television set of a subscriber. In this example, a double-pole eleven-throw stepping switch has the last ten contacts of section 82 connected to a respective line of tone source 63, there being a tone of a different frequency on each line. Each contact is identified by a respective integer which corresponds to an integer on a typical telephone-type dial. The first contact 64 of the switch section 65 is connected to the normally open contacts thereof 67 connecting reset coil 68 of the stepping switch to ground when closed, whereby the latter coil is energized from a source of positive potential upon terminal 71. The remaining contacts of section 65 are connected to relay solenoid 72 whereby the latter is energized by a source of positive potential on terminal 73 when the stepping switch assumes any position except the rest position on contact 64.

A stepping tone source 74 is connected by relay contacts 75 and 76, associated with relay solenoid 72 and dial switch 77 when closed, to stepping tone filter 78 whose output energizes the step solenoid 81 of the stepping switch. The arm 82 of section 62 couples one of the tones from tone source 63 through contacts 75 and 76, when solenoid 72 is energized, and dial switch 77 to cable distribution system 27. Cable distribution system 27 is energized by reset tone source 83 when push button 84 is depressed.

Operation of the central control system is as follows. Upon being reset, the stepping switch and relay contacts are as indicated. In this example, it is assumed that each control box is uniquely identified by a two digit number. This enables one hundred subscribers to be individually selected by this exemplary system, although it is apparent that these principles may be extended to individually select control boxes from a much larger group. Upon receiving a request from a subscriber for the exhibited film, an operator at the central control system merely dials the code number which identifies the subscriber and makes a note to charge the subscriber accordingly. For example, assume that a subscriber's number is 36, the operator initially dials 3, and switch 77 opens and closes three times, coupling three tone bursts from stepping tone source 74 to stepping tone filter 78. Filter 78 may be arranged to respond either to the makes or breaks caused in dialing by providing three pulses to the step solenoid 81, thereby moving arm 82 to contact 3 and arm 85 off contact 64 whereby solenoid 66 is deenergized and contacts 67 closed, thereby energizing reset solenoid 68. The stepping switch is arranged to reset only after a predetermined time interval has elapsed from the time reset solenoid 68 was energized, this time interval being long enough to permit the operator to dial the second digit, yet short enough to permit a subsequent selection to rapidly follow the first. When arm 85 is moved to a stationary position on one of the other contacts so that it remains there, solenoid 72 is energized thereby moving the arms associated with contacts 75 and 76 to the left. The latter contacts are not actuated as arm 85 is being stepped because the relay is arranged to be non-responsive to pulsed energization of solenoid 72. When the latter relay is actuated, the tone on contact 3 is coupled through arm 82 and contacts 75 and 76 to cable distribution system 27 when the dial switch 77 is operated. The operator then dials the next number, in this example 6, to send six bursts of the selected tone on contact 3 through the cable distribution system and to control box 28 (FIG. 1) which accepts the aforesaid selected tone and is arranged to be activated by six bursts thereof to permit the associated subscriber's television set to receive the exhibited film. Upon completion of a film, the operator need only depress pushbutton 84, thereby coupling a tone from reset tone source 83 which simultaneously deactivates the control boxes whereby the associated television sets are prevented from receiving the selected standard television signal. By utilizing this tone system of selection, the tones may be transmitted over the same transmission lines which carry the television signal. Moreover, by utilizing a tone source of impedance which appropriately matches the transmission line impedance, interference presented to other subscriber sets as selected subscribers are connected into the film exhibiting system are minimized.

Figure 5:
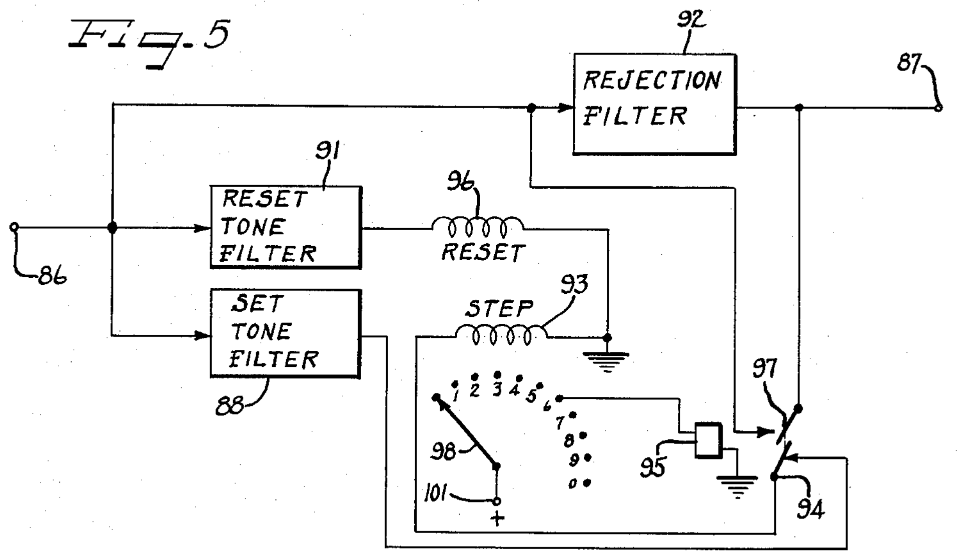
FIG. 5 is a combined block-schematic circuit diagram of the control box.

The means by which a particular control box is activated will be better understood by referring to FIG. 5 which illustrates an exemplary embodiment. The input signal from cable distribution system 27 is applied at terminal 86 and television signals coupled to the antenna terminals of television set 32 (FIG. 1) from terminal 87. This control box is seen to comprise a set tone filter 88, reset tone filter 91 and rejection filter 92, all with inputs coupled to input terminal 86. Set tone filter 88 is coupled to step winding 93 through relay contacts 94 when relay solenoid 95 is deenergized. Reset tone filter 91 energizes reset winding 96 of the control box stepping switch. Rejection filter 92 is shorted out when relay contacts 97 are closed in response to energization of relay solenoid 95.

Operation of this system is as follows: Continuing with the above example wherein the subscriber selected was identified by the number 36, set tone filter 88 is arranged to respond to the tone frequency supplied from contact 3 of stepping switch section 62 of FIG. 4. When the operator at the central control system dials the second digit to send six pulses over the distribution system, set tone filter 88 responds thereto with six output pulses which are coupled through contacts 94 to step winding 93, thereby stepping arm 98 to position 6 whereby relay solenoid 95 is energized from the source of positive potential on terminal 101, thereby opening contacts 94 and closing contacts 97. Contacts 97 are preferably of the coaxial type while contacts 94 may be conventional relay contacts. When control box 28 is in the deactivated state, contacts 97 are open as illustrated in FIG. 5, and rejection filter 92 is in the circuit. This filter is arranged to reject only the television channel occupied by the standard television signal from television transmitter 25 (FIG. 1) while passing all other channels. When contacts 97 are closed, rejection filter 92 is shorted and the aforesaid selected standard television signal may pass via a direct electrical path from terminal 86 through coaxial contacts 97 to output terminal 87, whereby the subscriber may tune television set 32 to this channel, thereby receiving the motion picture then being exhibited in the theater. Once the control box is selected and relay solenoid 95 energized, contacts 94 open, thereby preventing the control box stepping switch from responding to pulses of the same tone when transmitted to select another control box.

When exhibition of a particular film is complete, it is desirable to quickly disconnect all the control boxes. This is accomplished by depressing push button 84 (FIG. 4), thereby energizing the transmission lines with the reset tone. Reset tone filter 91 responds to the reset tone to provide a signal which energizes reset solenoid 96, thereby resetting the control box stepping switch.

As indicated above, an advantage of this dial system is that it is readily adaptable for automatic operation. Thus, instead of switch 77, (FIG. 5) being the dial switch in the control center, it may be the dial switch on the subscriber's telephone. When the subscriber dials the phone number of the control center, stepping tone source 74 is connected to the subscriber's telephone. Upon hearing this tone, the subscriber dials his own code number and suitable apparatus in the control office records the time and code number dialed, thereby providing a record which may be used to properly bill the subscriber.

A system has been disclosed which permits a motion picture to be exhibited in a theater simultaneously with being transmitted over a closed circuit television system to selected subscribers without interfering with the use of the closed circuit system for the transmission of other television programs. Moreover, the exhibitor may control which subscribers are selected or alternatively permit the requesting subscriber to activate his own control box and automatically create a record thereof. In either case, the number of viewers watching a particular presentation is available at all times. Furthermore, the subscriber is not burdened with mailing a record of fee programs viewed, and the exhibitor is not subjected to the expense of hiring employees to collect coins from the various control boxes.

Figure 6:
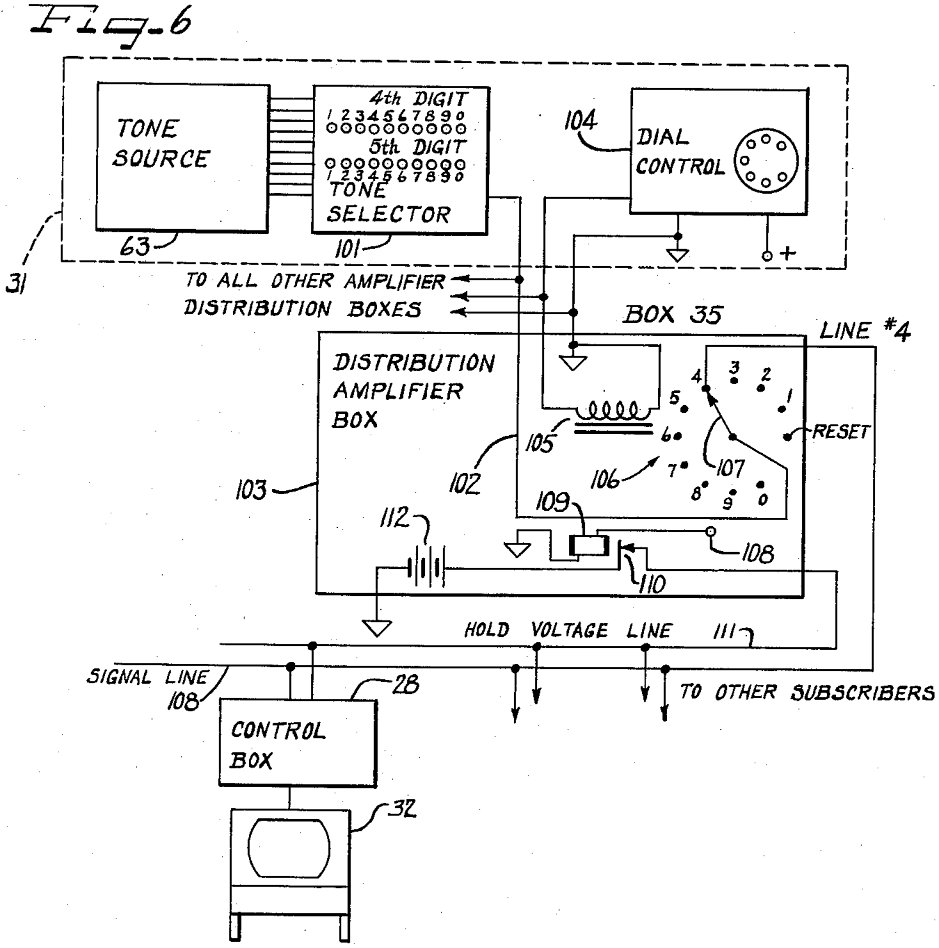
FIG. 6 is a combined block-schematic circuit diagram of an alternate control system.

Referring to FIG. 6, there is illustrated a combined block-schematic circuit diagram of a representative embodiment of a control system suitable for activating a still larger number of control boxes. This system is seen to comprise tone source 63 for energizing a tone selector 101 with ten tones, the latter selectively coupling one or two tones over line 102, which tones are supplied to a plurality of distribution amplifier boxes 103, one of which only being shown in FIG. 6. An appropriate distribution amplifier box is selected by dialed impulses transmitted from dial control 104, dialing the first two digits being effective in selecting an appropriate distribution amplifier box while impulses from the third dialed digit are coupled to solenoid 105 of stepping switch 106 to select a particular line therefrom and transmit thereover the tones selected by tone selector 101 to activate the selected control box 28 and couple the television picture to television set 32.

Distribution amplifier box 103 includes a battery 112 which supplies a hold voltage to hold voltage line 111 over relay contact 110 which is opened when solenoid 109 is energized with a potential from terminal 108. The specific means for energizing terminal 108 is not illustrated; however, the latter terminal is preferably energized in response to a particular number dialed from dial control 104 to enable all control boxes 28 to be simultaneously deactivated.

The mode of operation will be better understood by considering an example. For illustrative purposes, it is assumed that the code number of the subscriber it is desired to select is 35447. Dialing the first two digits from dial control 104 is effective in coupling the selected distribution amplifier box 103 to tone selector 101 and readying this distribution amplifier box to accept the next train of dial pulses, corresponding to the third digit, from dial control 104. These impulses are effective in moving arm 107 of stepping switch 106 to contact 4 whereby the selected tones may be transmitted to each control box 28 over signal line 108. The fourth and fifth digits are selected by pressing appropriate push buttons on the panel of tone selector 101, there being a unique combination of fourth and fifth digits for each control box 28 energized by a signal line 108. In this example, the fourth and fifth digits are 4 and 7 and the control box 28 identified by this code is activated whereby its rejection filter is by-passed.

Figure 7:
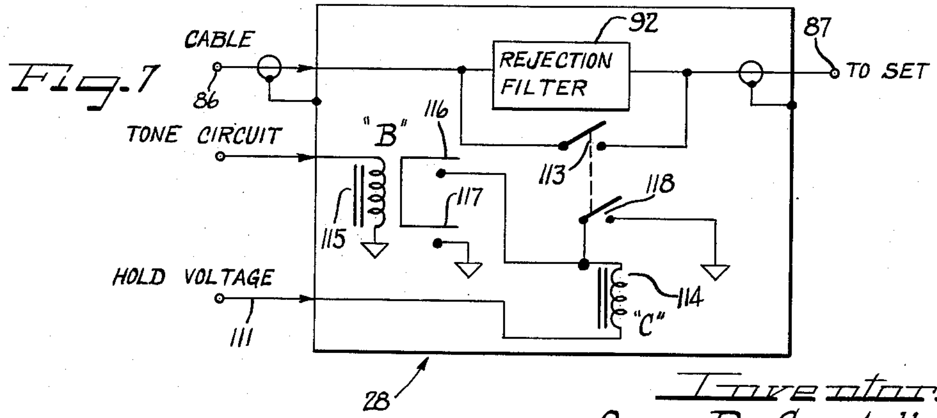
FIG. 7 is a combined block-schematic circuit diagram of a subscriber control box suitable for use with the system of FIG. 6.

With reference to FIG. 7, there is represented a combined block-schematic circuit diagram of a control box 28 suitable for use with the system of FIG. 6. In a manner similar to that described in connection with FIG. 5, the television signal is applied at terminal 86 and coupled through rejection filter 92 to output terminal 87 when control box 28 is deactivated. When the latter is activated, rejection filter 92 is shorted out by relay contact 113, thus permitting television set 32 to receive the pay channel. This occurs when the solenoid 114 of a hold relay is energized with a hold voltage supplied from line 111 in the following manner. The tones on signal line 108 energize solenoid 115 of a reed relay and if the reeds 116 and 117 have respective resonant frequencies which correspond to these tones, they vibrate to complete the circuit to solenoid 114, closing contact 113 and holding contact 118 whereby solenoid 114 remains energized until the hold voltage is removed upon the completion of transmitting the picture by energizing solenoid 109 (FIG. 6).

The specific system described herein is by way of example, it being apparent that those skilled in the art may make numerous modifications of and departures from the specific apparatus without departing from the inventive concepts. Consequently, the invention is to be construed as limited only by the scope and spirit of the appended claims.

We claim as our invention:

1. A closed circuit television system comprising means for deriving sound and video signals from a motion picture film, a source of a carrier signal, a television transmitter which combines the carrier signal with the sound and video signal to provide a standard television signal, a cable distribution system connected to energize the inputs of a plurality of control boxes, a standard television set connected to the output of a control box which, when deactivated, precludes the passage of said standard television signal applied to its input for energizing said television set while allowing television signals having frequency spectra in different channels to energize said television set, means for coupling said standard television signal from said television transmitter through said cable distribution system to the input of said control box, a central control system, and means for coupling control signals from said central control system over said cable distribution system to said control box to selectively activate the latter whereby said selected standard television signal may energize said television set.

2. A closed circuit television system which utilizes a cable distribution system carrying television signals whose frequency spectra occupy different television channels comprising, means for deriving sound and video signals from a motion picture film, a source of a carrier signal, a television transmitter which combines the carrier signal with said sound and video signals to provide a standard television signal having frequency spectra within a selected standard television channel, means for coupling said standard television signal to said cable distribution system, a control box energized by said cable distribution system, which when deactivated, precludes said standard television signal from passing to the control box output while passing said other television signals with frequency spectra occupying said different channels, a standard television set energized by the control box output, a central control system for supplying control signals, and means for coupling said control signals over said cable distribution system to said control box to selectively activate the latter whereby said standard television signal may be passed to the control box output.

3. A subscription type closed circuit television system for substantially simultaneously projecting a motion picture film upon a theater viewing screen and transmitting the same motion picture to selected television sets comprising, first and second pairs of motion picture projectors each comprising first and second projectors synchronously driven for projecting the same motion picture film respectively upon a viewing screen and a television camera, first changeover means for changing projection of a reel from the first projector of said first pair to the first projector of said second pair, second changeover means for transferring projection between the second projector of said first pair and the second projector of said second pair, delay means for activating said second changeover means after a time interval substantially equal to the time between projection of a frame by said first and second projectors, means for deriving a sound electrical signal from the sound track of the portion of said film then projected upon said television camera which camera provides a video signal, a source of a carrier signal, means for combining said sound and video signals with said carrier signal to provide a standard television signal having frequency spectra which lie within a predetermined standard television channel, a transmission line distribution system energized by said sandard television signal for coupling the latter signal to respective control boxes each associated with a standard television set and each comprising means whereby said predetermined television channel is normally precluded by said control box from being received by said television set while other television signal channels may be received, a control center, and means for coupling control signals from said control center over said transmission line system to activate only selected ones of said control boxes whereby the standard television sets associated therewith may also receive said predetermined television channel transmitting the entire program derived from said second projector of each of said first and second pairs of motion picture projectors.

4. A closed circuit television system comprising, means for deriving sound and video electrical signals from a motion picture film, a television transmitter for combining the sound and video signals with the carrier signal to provide a standard television signal having frequency spectra which lie within a predetermined standard television channel, a cable distribution system energized by said standard television signal and suitable for transmitting other television signals with frequency spectra lying within different standard television channels, respective control boxes energized by signals from said cable distribution system each associated with a standard television set whereby said standard television signal is normally precluded by said control box from being received by said television set while allowing the latter to receive said different television signals, a control center, and means for coupling control signals from said control center over said cable distribution system to activate only selected ones of said control boxes whereby the standard television sets associated therewith may be energized also with said standard television signal.

5. A closed circuit television system comprising, a source of a first standard television signal having frequency spectra which lie within a predetermined standard television channel, a cable distribution system energized by said standard television signal and adapted to also transmit concurrently other standard television signals having frequency spectra which lie within other standard television channels, respective control boxes energized by signals from said cable distribution system each associated with a standard television set having antenna terminals coupled to the control box output each control box comprising a filter normally interposed between the control box input and output which rejects said standard television signal while passing said other television signals, a dial control center, and means for coupling control signals initiated by said dial from said control center over said cable distribution system to activate a selected one of said control boxes whereby its associated filter is bypassed and the associated television set may then receive said standard television signal.

6. In a subscription type closed cricuit television system for substantially simultaneously projecting a motion picture film upon a theater viewing screen and transmitting the same motion picture to selected television sets, apparatus comprising, first and second pairs of motion picture projectors with first and second mechanically synchronized pairs of drive motors respectively, each of said pairs comprising first and second projectors synchronously driven by a respective motor pair for projecting the same motion picture film respectively upon a viewing screen and a television camera, first and second projection lamps in each projector respectively, first changeover means for changing projection of a reel from the first projector of said first pair to the first projector of said second pair, said first changeover means comprising, means for substantially simultaneously deenergizing the first lamp of said first pair, energizing the first lamp of said second pair and energizing said second pair of motors, second changeover means for transferring projection between the second projector of said first pair and the second projector of said second pair which second changeover means comprises, means for substantially simultaneously deenergizing said second lamp of said first pair and energizing said second lamp of said second pair, and delay means for activating said second changeover means after a time interval substantially equal to the time between projection of a particular frame by said first and second projectors.

7. A closed circuit television system comprising, first and second film projectors arranged to respectively project upon a theater screen and television camera, a feed magazine and a lower take-up magazine, synchronous driving means for moving film from said feed magazine through said first and second projectors to said take-up magazine, means for deriving a sound electrical signal from the sound track of the portion of said film then projected upon said television camera which camera provides a video signal, means for combining said sound and video electrical signals with a carrier signal to provide a standard television signal having a frequency spectrum which lies within a predetermined standard television channel, a transmission line distribution system energized by said standard television signal for coupling the latter signal to respective control boxes each associated with a standard television set whereby said standard television signal is normally precluded by said control box from being received by said television set, a control center, and means for coupling control signals from said control center over said transmission line system to activate only selected ones of said control boxes whereby the standard television sets associated therewith may be energized with said standard television signal.

8. Apparatus for substantially simultaneously projecting pictures upon a theater viewing screen and over a closed circuit television system comprising, first and second motion picture projectors synchronously driven whereby the same film passes in sequence through each projector with one projecting upon the viewing screen and the other upon a television camera, means for deriving an electrical sound signal from the sound track of said motion picture film which coincides with the portion of said film then being projected upon said television camera pick-up, means for deriving a video signal from said television camera characteristic of the portion of the film then being projected thereon, means for combining said sound and video signals with a carrier signal to provide a standard television signal which occupies a portion of the frequency spectrum within a predetermined standard television channel, a transmission line distribution system which is energized by said standard television signal and couples the latter to control boxes each associated with a respective standard television set and normally arranged to prevent the latter from responding to said standard television signal, a control center which provides control signals applied to said transmission line system for activating selected ones of said control boxes whereby a television receiver set associated with an activated control box may then respond to said standard television signal, and means for deactivating the activated control boxes in response to a signal supplied from said control center.

9. In a subscription type closed circuit television system for substantially simultaneously projecting a motion picture film upon a theater viewing screen and transmitting the same motion picture to selected television sets apparatus comprising, first and second pairs of motion picture projectors each comprising first and second projectors synchronously driven for projecting the same motion picture film respectively upon a viewing screen and a television camera, first changeover means for changing projection of a reel from the first projector of said first pair to the first projector of said second pair, second changeover means for transferring projection between the second projector of said first pair and the second projector of said second pair and delay means for activating said second changeover means after a time interval substantially equal to the time between projection of a particular frame by said first and second projectors.

10. In a subscription type closed circuit television program distribution system, means for providing centralized control affording current records of each customer's program reception comprising, a cable distribution system connecting a central control center to each of a plurality of distribution terminals, means to apply a video program to said cable distribution system, signal translating means connected between each of said distribution terminals and said cable, each of said signal translating means being normally non-conductive with respect to said applied video program, and means to apply predetermined signals from said central control center to said cable distribution system to render any selected one of said signal translating means conductive with respect to said applied video program to permit said program to reach the distribution terminal connected to said selected signal translating means.

11. A changeover system for first and second pairs of motion picture projectors each pair comprising first and second projectors synchronously driven for projecting the same motion picture film and first and second projection lamps in the projectors respectively, said changeover system comprising first changeover means for changing projection of a reel from the first projector of said first pair to the first projector of said second pair, said first changeover means comprising means for substantially simultaneously deenergizing the first lamp of said first pair, energizing the first lamp of said second pair and energizing said second pair of projectors; second changeover means for transferring projection between the second projector of said first pair and the second projector of said second pair which second changeover means comprises means for substantially simultaneously deenergizing said second lamp of said first pair and energizing said second lamp of said second pair; and delay means for activating said second changeover means after a time interval substantially equal to the time between projection of a particular frame by said first and second projectors.

12. A closed circuit television system comprising a source of standard television signal having frequency spectra which lie within a predetermined standard television channel, a cable distribution system energized by said standard signal and adapted to also transmit concurrently other television signals having frequency spectra which lie within other standard television channels, at least one control box adapted to be energized by signals from said cable distribution system, said control box being associated with a standard television set having antenna terminals coupled to the output of said control box, said control box comprising a filter normally interposed between the control box input and output which rejects said standard television signal while passing said other television signals, a control center, conductor means for coupling control signals initiated by said control center to activate said control box whereby its associated filter is bypassed and the associated television set may then receive said standard television signal.

13. A closed circuit television system comprising a source of standard television signal having frequency spectra which lie within a predetermined standard television channel, a cable distribution system energized by said standard television signal and adapted to also transmit concurrently other television signals having frequency spectra which lie within other standard television channels, at least one control box energized by signals from said cable distribution system, said control box being associated with a standard television set which has antenna terminals coupled to the output of said control box, said control box comprising a filter normally interposed between the input and the output of said control box which rejects said standard television signal while passing said other television signals, a control center, a conductor for coupling control signals initiated by said control center to activate said control box whereby its associated filter is bypassed and the associated television set may then receive said standard television signal, said control box including relay means which is adapted to be placed in a first position when said control box is activated and to be placed in a second position in response to an electrical signal received over said cable distribution system when said control box is de-activated.

References Cited in the file of this patent

UNITED STATES PATENTS

| | | |
|---|---|---|
| 2,189,310 | Curtis | Feb. 6, 1940 |
| 2,237,376 | Strong | Apr. 8, 1941 |
| 2,343,046 | Stefano | Feb. 29, 1944 |
| 2,510,621 | DeFrance | June 6, 1950 |
| 2,542,188 | Gates | Feb. 20, 1951 |
| 2,546,338 | Glasford | Mar. 27, 1951 |
| 2,607,846 | Hubbard | Aug. 19, 1952 |
| 2,816,156 | Pawley et al | Dec. 10, 1957 |
| 2,833,850 | Bartelink | May 6, 1958 |
| 2,843,654 | Gottfried | July 15, 1958 |

FOREIGN PATENTS

| | | |
|---|---|---|
| 995,694 | France | Aug. 22, 1951 |

OTHER REFERENCES

"Fundamental Problems of Subscription Television: the Logical Organization of the Telemeter System," Journal of the SMPTE, vol. 61, August 1953, pp. 183–194.